United States Patent
Austruy et al.

(10) Patent No.: US 10,382,576 B2
(45) Date of Patent: Aug. 13, 2019

(54) TRANSPARENT SERVER FAILOVER IN STATEFUL DISTRIBUTED PROTOCOLS

(71) Applicant: VMware, Inc., Palo Alto, CA (US)

(72) Inventors: Maxime Austruy, Lausanne (CH); Rick Spillane, Mountain View, CA (US); Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 120 days.

(21) Appl. No.: 15/655,069

(22) Filed: Jul. 20, 2017

(65) Prior Publication Data
US 2019/0026200 A1    Jan. 24, 2019

(51) Int. Cl.
   *G06F 11/20* (2006.01)
   *H04L 29/08* (2006.01)
   *G06F 9/455* (2018.01)
   *H04L 12/24* (2006.01)

(52) U.S. Cl.
   CPC ...... *H04L 67/2823* (2013.01); *G06F 9/45533* (2013.01); *G06F 11/203* (2013.01); *H04L 41/00* (2013.01); *H04L 67/1034* (2013.01); *G06F 2201/805* (2013.01); *H04L 67/10* (2013.01)

(58) Field of Classification Search
   CPC ...... G06F 11/203; G06F 11/00; G06F 11/202; G06F 11/2033; G06F 11/2035; H04L 67/02; H04L 67/28; H04L 67/022842; H04L 67/10; H04L 67/289; H04L 67/22
   See application file for complete search history.

(56) References Cited

U.S. PATENT DOCUMENTS

| | | | | |
|---|---|---|---|---|
| 7,334,257 B1* | 2/2008 | Ebrahimi | ............... | H04L 63/08 380/255 |
| 7,917,475 B2* | 3/2011 | D'Souza | ............... | G06F 16/252 707/656 |
| 8,161,318 B2* | 4/2012 | D'Souza | ............ | G06F 11/2028 714/6.2 |
| 2005/0086342 A1* | 4/2005 | Burt | .................... | H04L 41/0663 709/224 |
| 2007/0168500 A1* | 7/2007 | D'Souza | ............... | G06F 15/173 709/224 |
| 2014/0089468 A1* | 3/2014 | Joong | ................. | H04L 67/2847 709/219 |
| 2014/0365660 A1* | 12/2014 | Wang | .................. | H04L 67/1014 709/226 |
| 2018/0241849 A1* | 8/2018 | Edmiston | ............... | H04L 67/42 |

* cited by examiner

*Primary Examiner* — Nadeem Iqbal
(74) *Attorney, Agent, or Firm* — Fish & Richardson P.C.

(57) ABSTRACT

Exemplary methods, apparatuses, and systems include a proxy intercepting, from a client, a plurality of requests addressed to a first server. The proxy adds an entry for each of the plurality of requests to a data structure. Each entry includes data from one of the plurality of requests. The proxy forwards each of the plurality of requests to the first server. In response to detecting the first server was unavailable or otherwise failed, the proxy reconnects to the first server when the first server recovers or connects to a second server serving as a backup for the first server. The proxy transmits to the first or second server one or more commands using the entries of the data structure to restore state information for the client.

20 Claims, 4 Drawing Sheets

TRANSPARENT SERVER FAILOVER IN STATEFUL DISTRIBUTED PROTOCOLS

FIELD OF THE INVENTION

The various embodiments described in this document relate to distributed protocols. In particular, embodiments relate to a protocol proxy maintaining state information to enable a server to failover in a manner that is transparent to a client.

BACKGROUND OF THE INVENTION

Distributed protocols, such as NFS (Network File System), SMB (Server Messenger Block), 9P/Plan 9 Filesystem, etc., serve a critical role in distributed systems. These protocols define the interactions between clients and servers. Many distributed protocols are stateful. The failure of a server operating under a stateful distributed protocol may have a significant impact on the operation of those clients. For example, the failure of a server in a distributed file system protocol may result in rebooting or failover of the server and thus the loss of client state information including identifiers of open files established by clients as well as the state of locks on files. This loss of state may lead to a failure on the client-side. Requiring the server to commit this information to persistent memory to make it stateless, however, would significantly slow client-server transactions.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

This document describes embodiments that include a proxy intercepting a plurality of client requests addressed to a first server. The proxy uses the intercepted requests to update a data structure to maintain state information for the client and first server. The proxy forwards each of the plurality of requests to the first server. In response to detecting a failure of the first server, the proxy reconnects to the first server (e.g., upon reboot of the server) or connects to a second server serving as a backup for the first server. The proxy transmits one or more commands using entries of the data structure to restore state information for the client with the recovered or backup server. Additionally, the proxy can retransmit requests that were "in-flight" and did not receive a response from the first server at the time the first server failed. As a result, the distributed system supports recovery or failover for a server operating under a stateful protocol in a manner that is transparent to the client and without requiring the server or protocol to be stateless. The proxy handles recovery of state so that the client, at most, experiences a minor slowdown in performance and is unaware of the server failure.

Figure 1:
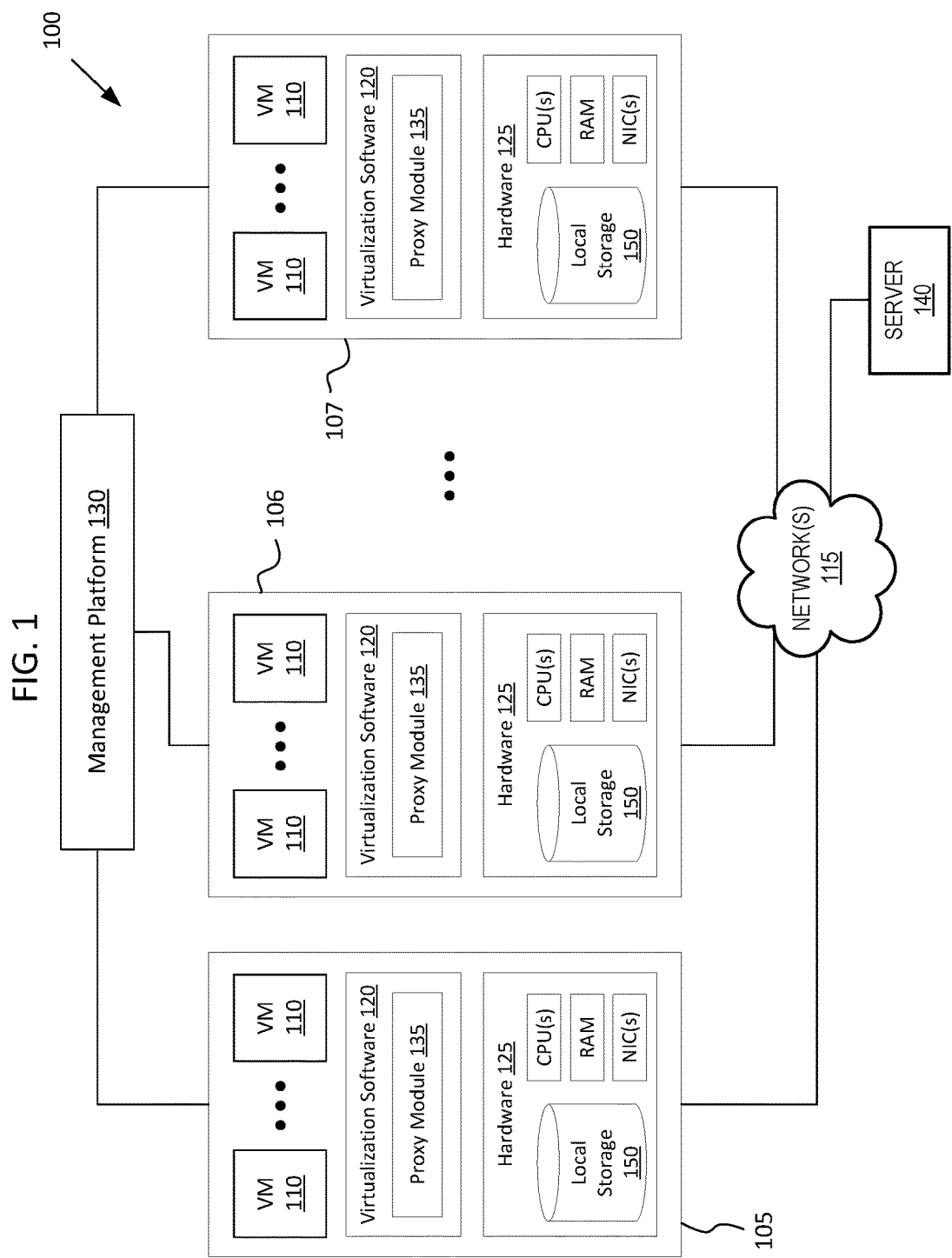
FIG. 1 illustrates, in block diagram form, an exemplary virtual data center environment including one or more networked processing devices implementing transparent server failover in a stateful distributed protocol.

FIG. 1 illustrates, in block diagram form, exemplary computing environment 100, including one or more networked nodes 105-107 to implement transparent server failover in a stateful distributed protocol. Nodes 105-107 may also be referred to within this document as physical computers, hosts, and/or servers. In one embodiment, one or more virtual machines (VMs) 110 implement a virtualized computer, that can provide computing services such as a network server, remote productivity desktop or a networking, storage, or security service (e.g., a firewall, webserver, database server, etc.). Although not shown, one or more of VMs 110 may include containerized applications, or be generally referred to as data compute nodes (DCNs), which could include application containers as further described within this document.

Hardware 125 includes one or more processors ("CPU(s)"), data storage and memory (e.g., "RAM"), and network interface controllers ("NIC(s)"). The data storage and memory may be used for storing data, metadata, and programs for execution by the processor(s). The data storage and memory may include one or more of volatile and non-volatile memories, such as Random Access Memory ("RAM"), Read Only Memory ("ROM"), a solid-state drive ("SSD"), Flash, Phase Change Memory ("PCM"), or other types of data storage, such as magnetic disk drives, optical disk drives, etc. The memory may be internal or distributed memory.

One or more buses may interconnect the various components of hardware 125. Additionally, the network interface controllers may connect nodes 105-107, via a wired or wireless network(s) 115, with one another. For example, network(s) 115 may include one or more of a local area network (LAN), private or publicly accessible wide area network (WAN) such as the internet, etc.

Virtualization software layer 120 runs on hardware 125 of nodes 105-107. Virtualization software layer 120 manages VMs 110 and physical resources, such as hardware 125. Additionally, virtualization software layer 120 maintains virtual-to-physical hardware mappings. For example, virtualization software 120 may manage VM access to a processor, memory, or a network interface within hardware 125. Additionally, virtualization software 120 may manage access to virtual disks (or portions thereof) and other related files within local storage 150 that may be accessed by VMs 110 residing in one or more nodes 105-107.

Management platform 130 is associated with nodes 105-107. Management platform 130 enables an administrator to manage the configuration of computing environment 100. In one embodiment, management platform 130 provides a management console for manual and automated control of nodes 105-107, VMs 110, and hardware 125. For example, management platform 130 may provision, configure, and maintain VMs 110 as virtual desktops or network services, manage pools of computer resources to run VMs 110, etc. In one embodiment, management platform 130 configures proxy modules 135 to intercept packets. For example, management platform 130 may provide a list of destination addresses for servers to trigger proxy module 135 to intercept requests as described in this document. While illustrated as being directly connected to nodes 105-107, management platform 130 may connect to nodes 105-107 via network(s) 115.

Local storage 150 housed in or otherwise directly attached to nodes 105-107 may include combinations of solid-state drives (SSDs) and/or magnetic or spinning disks (MDs). As used in this document, the term "housed" or "housed in" may be used to encompass both housed in or otherwise directly attached storage. In certain embodiments, SSDs serve as a read cache and/or write buffer in front of magnetic disks to increase I/O performance.

Each of nodes 105-107 includes proxy module 135. In one embodiment, proxy module 135 is a part of virtualization software 120. In another embodiment, proxy module 135 is implemented within a VM 110 or another position in the communication path between a client and server. For example, proxy module 135 intercepts requests transmitted by a client implemented by a VM 110 and destined for server 140 or a server implemented by another VM 110. In one embodiment, proxy module 135 is within the same failure domain as the client it serves. For example, running proxy module 135 on the same physical computer (e.g., node 105) as the client (e.g., a VM 110 on node 105) will keep proxy module 135 in the same failure domain as the client because they both will be subject to the same failures of the physical computer.

Proxy module 135 implements transparent server failover in a stateful distributed protocol as described with reference to FIG. 2. While described with reference to computing environment 100, proxy module 135 may also be implemented in other computing environments. For example, proxy module 135 may implement the transparent server failover in a stateful distributed protocol described within this document in a server, computer, or other computing environment that does not include virtual machines.

Figure 2:
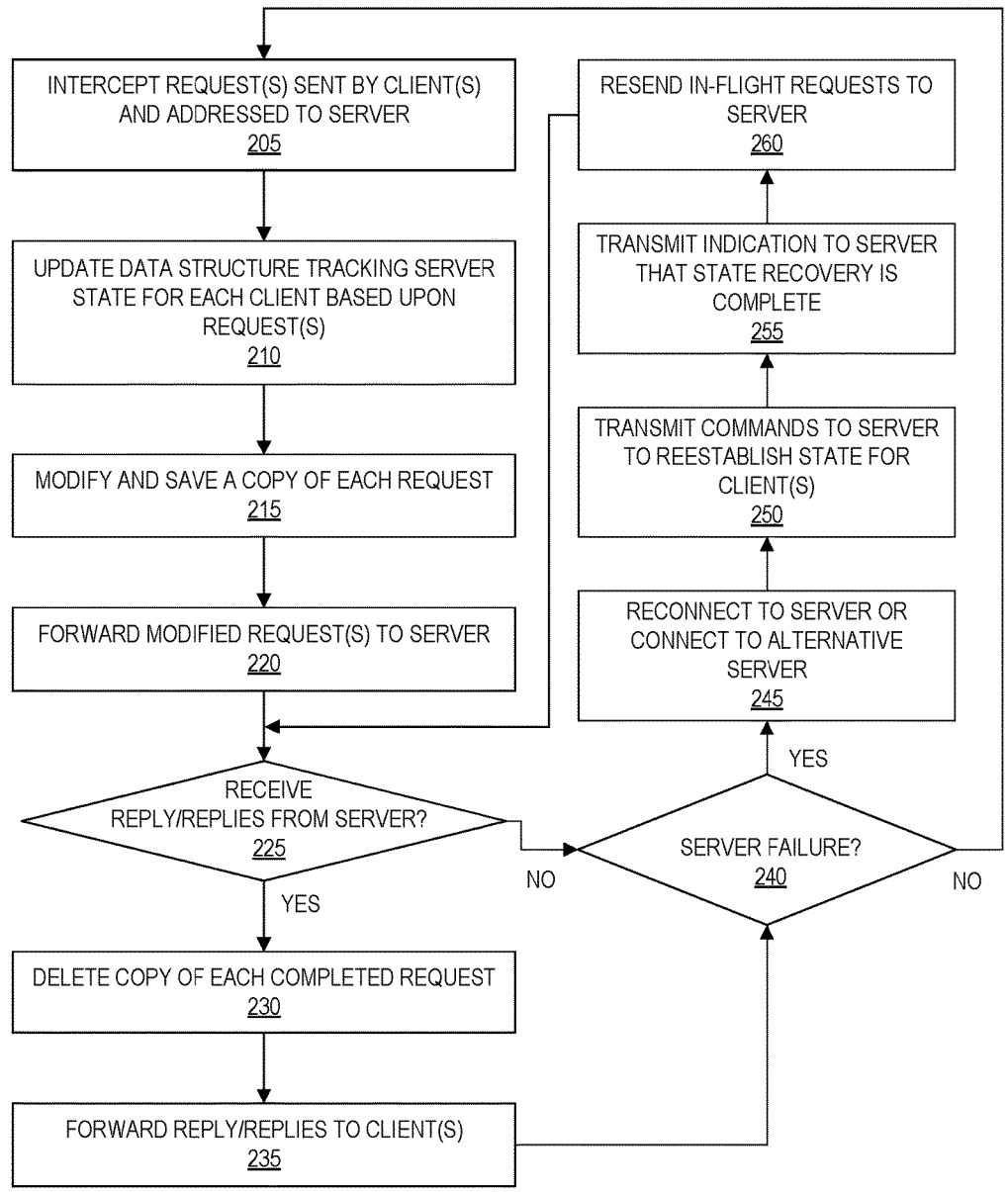
FIG. 2 is a flow chart illustrating an exemplary method of transparent server failover in a stateful distributed protocol.
Figure 3:
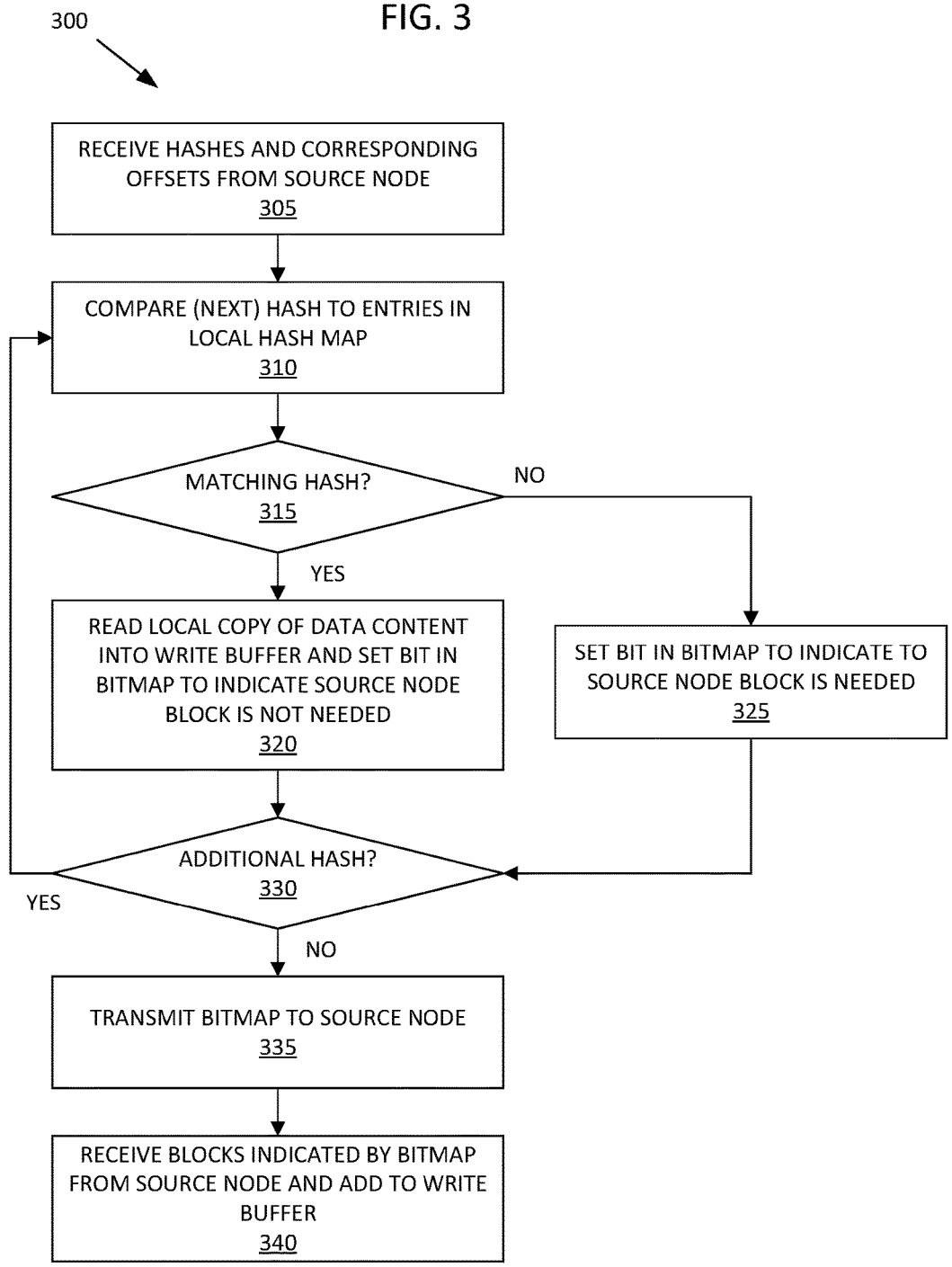
Figure 4:
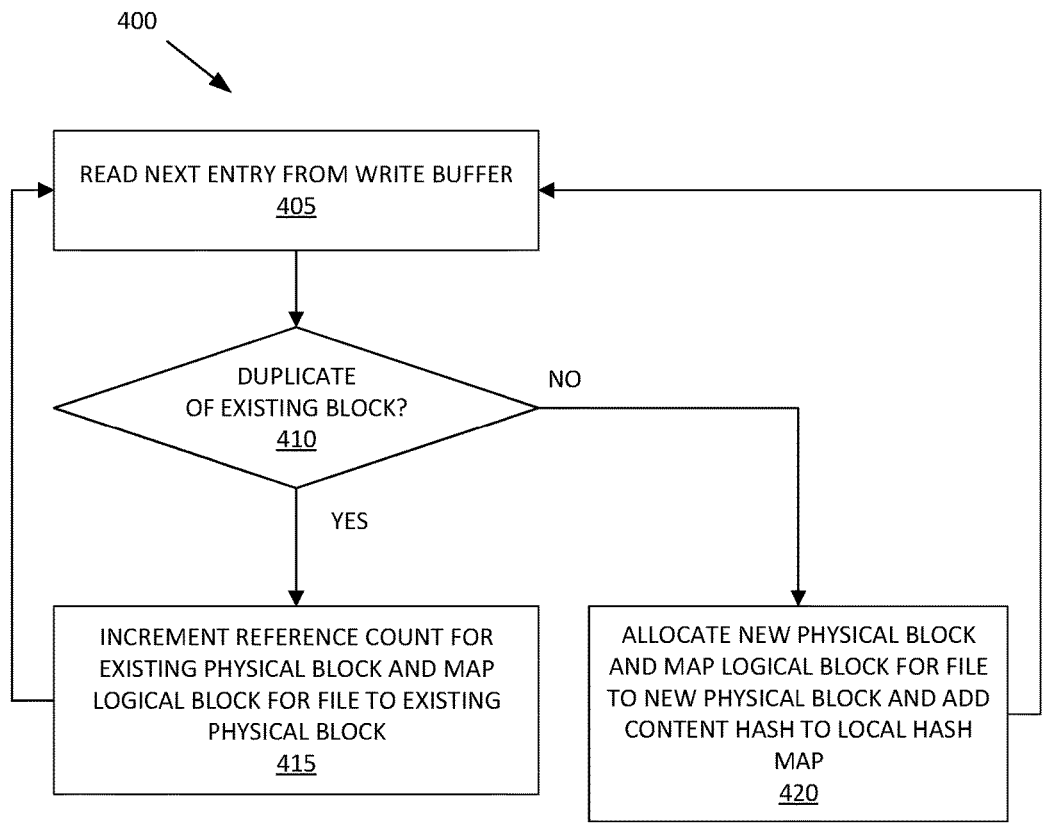

FIG. 2 is a flow chart illustrating exemplary method 200 of transparent server failover in a stateful distributed protocol. At block 205, proxy module 135 intercepts a request sent by a client and addressed to a server. For example, a VM 110 running on host 105 may be a client transmitting a request to server 140. Proxy module 135, as a part of virtualization software 120, lies in the transmission path between VM 110 and the NIC that host 105 uses to transmit requests to server 140. In another embodiment, proxy module 135 is implemented outside of virtualization software. For example, a proxy agent (not illustrated) in virtualization software 120 route the request from one VM 110 to another VM that implements proxy module 135.

In one embodiment, proxy module 135 intercepts a request based upon the destination address of the request matching an entry in a list of server addresses, e.g., provided by management platform 130. In another embodiment, proxy module intercepts requests based upon detecting that the request matches one of a plurality of requests that may be transmitted to a server according to a distributed protocol.

In one embodiment, proxy module 135 intercepts multiple requests from one client. For example, proxy module 135 may batch requests from the client. In one embodiment, proxy module 135 intercepts requests from multiple clients. For example, multiple VMs 110 on host 105 may be clients of server 140. In such an example, proxy module intercepts requests from each client.

At block 210, proxy module 135 updates a data structure tracking the server state for the client based upon the intercepted request. For example, proxy module 135 maintains a state table or other data structure in storage 150. In an embodiment in which the protocol is for a distributed file system, proxy module 135 updates the data structure to map, per client, full path filenames to file identifiers. Additionally, proxy module 135 may maintain a lock state of a file or other state information on behalf of each client.

At block 215, proxy module 135 optionally modifies the intercepted request. In an embodiment in which proxy module 135 intercepts requests from multiple clients, proxy module 135 modifies the request to be unique to the client transmitting the request. Returning to the distributed file system example, proxy module may add a prefix or suffix value to the file identifier received from a client. Proxy module 135 uses a unique prefix or suffix for each client. As a result, if two clients attempt to use the same file identifier, proxy module 135 modifies each file identifier to be unique to the respective client.

In one embodiment, proxy module 135 adds a serial number or other set of one or more values to the intercepted request to uniquely identify the request. For example, one or more clients may transmit similar requests or commands and, if forwarded without modification, proxy module 135 may not be able to differentiate between replies. In one embodiment, the serial number is a field of 16 bits, enabling proxy module to track up to 65,535 unique requests at a time.

In one embodiment, proxy module 135 utilizes the serial numbers to improve idempotency of requests. For example, the server may maintain a logical log of requests to provide crash consistency. Before the server handles the request, the server writes the request to the logical log. If the request includes a serial number, the server writes the request to the logical log with the serial number. Once the server processes the request, the server also writes the reply or return result to the logical log entry. If the server receives another request with a serial number matching the serial number of a request written to the logical log, the server returns the reply recorded to the log rather than, e.g., performing the request again. Thus, the server processes requests once, making them idempotent. In one embodiment, the server does not add error replies to the log. Retrying such a request (e.g., as described with reference to block 260), however, is safe. For example, if a request to create a new file failed because the file already exists, retrying such a request will result in the server generating the same error.

In one embodiment, proxy module 135 periodically transmits a low watermark of the serial numbers to the server. The low watermark indicates that any serial numbers lower than the low watermark value represent replies forwarded to the client(s) and no longer need to be tracked. In one embodiment, proxy module 135 periodically transits a range of serial numbers to track or to free. For example, as the serial numbers reach the upper limit, proxy module may seek to reuse serial numbers of the bottom of the range. By indicating to the server which serial numbers to track in the log and which should be deleted from the server log, proxy module 135 is able to reuse serial numbers.

Proxy module 135 saves a copy of the request or modified request. For example, proxy module 135 saves a copy of "in-flight" requests in storage 150 to enable proxy module 135 to resend requests if needed.

At block 220, proxy module 135 forwards the request to the server. For example, proxy module 135 transmits the request/modified request via a NIC to server 140.

At block 225, proxy module 135 determines if it has received any replies from the server in response to the recently forwarded request or previous requests. For example, proxy module 135 is the path of client-server communications, enabling it to also intercept replies to client requests.

If proxy module 135 has received a reply directed to a client, at block 230, proxy module 135 deletes the stored copy of the request corresponding to the reply. For example, once an in-flight request has received a reply completing the request (i.e., proxy module 135 does not need to resend the request), proxy module 135 deletes the stored copy of that request. In one embodiment, proxy module 135 updates the state data structure for the client upon receiving a reply. For example, a state may not be established until the server sends the reply.

At block 235, proxy module 135 forwards the reply to the client. In an embodiment in which proxy module 135 modifies the request, proxy module 135 may need to modify the reply. For example, a reply may include a modified file identifier. Proxy module 135 removes the prefix or suffix value from the modified file identifier in the reply and forwards the modified reply to the client.

If proxy module 135 has not received a reply directed to a client or following block 235, at block 240, proxy module 135 determines if the server has failed. In one embodiment, server failure includes an event that causes the server to reboot, failover to another computer, or otherwise results in the loss of state information for clients. For example, proxy module 135 monitors a network connection with the server. If the proxy module 135 detects that the connection is timed out, terminated, or otherwise closed, proxy module 135 determines that the server has failed. In one embodiment, proxy module 135 detects a server failure at other points in method 200 and handles the failure as described with reference to blocks 240-260.

If the server has not failed, method 200 returns to block 205. If proxy module 135 detects a server failure, at block 245, proxy module 135 reconnects to the server (e.g., upon the server rebooting) or connects to an alternative server. An alternative server may include a failover server or another server within a pool of servers that included the failed server.

At block 250, proxy module 135 transmits commands to the server to reestablish the state information for each client. For example, proxy module 135 reads the state information for each client from the state data structure and transmits requests or other commands to the server to return the server to the state saved by proxy module 135. In a distributed file system embodiment, e.g., proxy module 135 transmits commands to reestablish file identifiers and file locks as represented by the state information saved by proxy module 135.

At block 255, proxy module 135 transmits an indication to the server that proxy module 135 has completed transmitting state recovery commands. As a result, the server can determine when state information has been recovered and the server can return to normal operations. This prevents, e.g., a first client attempting to alter a file before a state including another client having a lock on the file being reestablished. In one embodiment, proxy module 135 receives a confirmation from the server when the server has completed state recovery. For example, one or more proxy modules 135 and/or clients may attempt to reestablish state with the server before the server completes the state recovery process. The server indicates to all proxy modules 135 when all state information has been recovered.

At block 260, proxy module 135 resends in-flight requests to the server for which proxy module did not receive/intercept a reply. As described with reference to block 230, proxy module 135 deletes copies of completed requests. In-flight commands for which proxy module 135 has not received a reply or otherwise have not been completed will remain stored. Proxy module 135 reads these stored in-flight commands and retransmits them to the server.

Method 200 returns to block 225 and proxy module 135 determines if a reply is received for each resent in-flight request.

As a result, proxy module 135 handles recovery of state so that the client(s), at most, experience a minor slowdown in server performance but are otherwise unaware of the server failure and recovery performed by proxy module 135. A client will not receive errors in response to requests dependent upon state information lost by the server failure and the client will not need to reestablish state information with the server.

It will be apparent from this description that aspects of the inventions may be embodied, at least in part, in software. That is, the computer-implemented method 200 may each be carried out in a computer system or other data processing system, such as nodes 105-107, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. It will also be appreciated that additional components, not shown, may also be part of nodes 105-107, and, in certain embodiments, fewer components than that shown in FIG. 1 may also be used in nodes 105-107.

An article of manufacture, such as a non-transitory computer readable medium, may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document, or portions thereof, may be repeated or performed in parallel with one another or in parallel with different instances of the same or similar methods.

What is claimed is:

1. A computer-implemented method, comprising:
   intercepting, by a proxy, a plurality of requests sent by a client and addressed to a first server;
   adding, by the proxy, an entry for each of the plurality of requests to a data structure, each entry including data from one of the plurality of requests;
   forwarding, by the proxy, each of the plurality of requests to the first server;
   detecting, by the proxy, that the first server is unavailable;
   connecting, by the proxy in response to detecting the first server was unavailable, to the first server when the first server recovers or to a second server serving as a backup for the first server;
   transmitting, by the proxy to the first or second server, one or more commands using the entries of the data structure to restore state information for the client; and
   transmitting, by the proxy to the first or second server, an indication that state recovery for the client is complete.

2. The computer-implemented method of claim 1, further comprising:
   receiving, by the proxy from the first or second server, an indication that the first or second server has completed recovery of state information;
   detecting, by the proxy, that a response to a first request of the plurality of requests was not received prior to detecting that the first server was unavailable; and
   in response to detecting that the response was not received and the first or second server completing recovery of state information, transmitting the first request from the proxy to the first or second server.

3. The computer-implemented method of claim 1, wherein the proxy resides in a same fault domain as the client.

4. The computer-implemented method of claim 1, further comprising:
   modifying, by the proxy, each request before forwarding the request to the first server.

5. The computer-implemented method of claim 4, wherein modifying each request includes adding a serial number field to uniquely identify the request.

6. The computer-implemented method of claim 4, wherein modifying each request includes modifying a file identifier.

7. The computer-implemented method of claim 6, wherein the proxy intercepts requests from multiple clients and modifying the file identifier includes adding a client identifier to the file identifier.

8. The computer-implemented method of claim 1, wherein the data from each of the plurality of requests added to the data structure includes a file identifier selected by the client to reference a file stored by the first server and a full path name for the file.

9. The computer-implemented method of claim 1, wherein the data from a first request of the plurality of requests added to the data structure includes a full copy of the first request, the method further comprising:
   receiving, by the proxy, a reply from the first server in response to the first request;
   in response to the reply from the first server, deleting the full copy of the first request; and
   forwarding, from the proxy to the client, the response to the first request.

10. A non-transitory computer-readable medium storing instructions, which when executed by a processing device, cause the processing device to perform a method comprising:
    intercepting, by a proxy, a plurality of requests sent by a client and addressed to a first server;
    adding, by the proxy, an entry for each of the plurality of requests to a data structure, each entry including data from one of the plurality of requests;
    forwarding, by the proxy, each of the plurality of requests to the first server;
    detecting, by the proxy, that the first server is unavailable;
    connecting, by the proxy in response to detecting the first server was unavailable, to the first server when the first server recovers or to a second server serving as a backup for the first server;
    transmitting, by the proxy to the first or second server, one or more commands using the entries of the data structure to restore state information for the client; and
    transmitting, by the proxy to the first or second server, an indication that state recovery for the client is complete.

11. The non-transitory computer-readable medium of claim 10, the method further comprising:

receiving, by the proxy from the first or second server, an indication that the first or second server has completed recovery of state information;

detecting, by the proxy, that a response to a first request of the plurality of requests was not received prior to detecting that the first server was unavailable; and in response to detecting that the response was not received and the first or second server completing recovery of state information, transmitting the first request from the proxy to the first or second server.

12. The non-transitory computer-readable medium of claim 10, wherein the proxy resides in a same fault domain as the client.

13. The non-transitory computer-readable medium of claim 10, the method further comprising:

modifying, by the proxy, each request before forwarding the request to the first server.

14. The non-transitory computer-readable medium of claim 13, wherein modifying each request includes adding a serial number field to uniquely identify the request.

15. The non-transitory computer-readable medium of claim 13, wherein modifying each request includes modifying a file identifier.

16. The non-transitory computer-readable medium of claim 15, wherein the proxy intercepts requests from multiple clients and modifying the file identifier includes adding a client identifier to the file identifier.

17. The non-transitory computer-readable medium of claim 10, wherein the data from each of the plurality of requests added to the data structure includes a file identifier selected by the client to reference a file stored by the first server and a full path name for the file.

18. An apparatus comprising:
a processing device; and
a memory coupled to the processing device, the memory storing instructions which, when executed by the processing device, cause the apparatus to:
intercept a plurality of requests sent by a client and addressed to a first server;
add an entry for each of the plurality of requests to a data structure, each entry including data from one of the plurality of requests;
forward each of the plurality of requests to the first server;
detect that the first server is unavailable;
in response to detecting the first server was unavailable, connect to the first server when the first server recovers or to a second server serving as a backup for the first server;
transmit, to the first or second server, one or more commands using the entries of the data structure to restore state information for the client; and
transmit, by the proxy to the first or second server, an indication that state recovery for the client is complete.

19. The apparatus of claim 18, further causing the apparatus to:
receive, by the proxy from the first or second server, an indication that the first or second server has completed recovery of state information;
detect, by the proxy, that a response to a first request of the plurality of requests was not received prior to detecting that the first server was unavailable; and
in response to detecting that the response was not received and the first or second server completing recovery of state information, transmit the first request from the proxy to the first or second server.

20. The apparatus of claim 18 wherein the proxy resides in a same fault domain as the client.

* * * * *